(12) United States Patent
Enomoto et al.

(10) Patent No.: US 10,621,395 B2
(45) Date of Patent: Apr. 14, 2020

(54) DEVICE AND METHOD FOR DETECTING MOVEMENT OF RADIO TAG

(71) Applicant: DENSO WAVE INCORPORATED, Chita-gun, Aichi-pref. (JP)

(72) Inventors: Kohei Enomoto, Chita-gun (JP); Masayuki Ogawa, Chita-gun (JP); Yusuke Masuda, Chita-gun (JP)

(73) Assignee: DENSO WAVE INCORPORATED, Aichi-Pref. (JP)

( * ) Notice: Subject to any disclaimer, the term of this patent is extended or adjusted under 35 U.S.C. 154(b) by 0 days.

(21) Appl. No.: 16/143,950

(22) Filed: Sep. 27, 2018

(65) Prior Publication Data
US 2019/0102584 A1  Apr. 4, 2019

(30) Foreign Application Priority Data
Sep. 29, 2017  (JP) ................................. 2017-189510

(51) Int. Cl.
*G06K 7/08* (2006.01)
*G06K 7/10* (2006.01)
(Continued)

(52) U.S. Cl.
CPC ........ *G06K 7/10366* (2013.01); *G01S 13/758* (2013.01); *G01S 13/84* (2013.01)

(58) Field of Classification Search
CPC .... G01S 13/758; G01S 13/84; G06K 7/10366
See application file for complete search history.

(56) References Cited

U.S. PATENT DOCUMENTS

2009/0219141 A1* 9/2009 Pillai ................... G06K 7/0008
340/10.2
2009/0303004 A1  12/2009 Tuttle
(Continued)

FOREIGN PATENT DOCUMENTS

JP  2016-170046 A  9/2016

OTHER PUBLICATIONS

Wang Zhongqin et al: "TrackT: Accurate tracking of RFID tags with mm-level accuracy using first-order taylor series approximation", AD HOC Networks, Elsevier, Amsterdam, NL, vol. 53 Oct. 1, 2016, pp. 132-144, XP029783695.
(Continued)

*Primary Examiner* — Thien M Le
(74) *Attorney, Agent, or Firm* — Oliff PLC

(57) ABSTRACT

In a configuration for detection of a movement state of a radio tag using a phase difference of a response wave from the radio tag, a phase $\varphi[i]$ and a measurement time $t[i]$ of a response wave from a radio tag measured are sequentially stored in a memory. A difference from a previous phase and a difference from a previous measurement time with respect to each phase $\varphi[i]$ stored in the memory are calculated as a phase difference $\Delta\varphi[i]$ and a time difference $\Delta t[i]$. A phase addition value $\varphi sum[i]$ obtained by cumulatively adding a plurality of the phase differences $\Delta\varphi[i]$ is calculated so as to correct a phase difference in which the corresponding time difference $\Delta t[i]$ among the calculated plurality of the phase differences $\Delta\varphi[i]$ exceeds a time threshold tsa [i], whereby the movement state of the radio tag is detected based upon the calculated phase addition value $\varphi sum[i]$.

8 Claims, 10 Drawing Sheets

(51) Int. Cl.
*G01S 13/84* (2006.01)
*G01S 13/75* (2006.01)

(56) References Cited

U.S. PATENT DOCUMENTS

| | | | |
|---|---|---|---|
| 2014/0285324 A1* | 9/2014 | Austin | G01S 13/84 340/10.3 |
| 2016/0104013 A1* | 4/2016 | Fessler | G06K 19/0723 340/10.1 |
| 2017/0200032 A1* | 7/2017 | Sample | G06F 16/786 |
| 2018/0247094 A1* | 8/2018 | Khojastepour | G01S 5/0215 |

OTHER PUBLICATIONS

Branislav Kusy et al: "Tracking mobile nodes using RF Doppler shifts", Sensys '07 Proceedings of the 5th ACM Conference on Embedded Networked Sensor Systems: Sydney, Australia, Nov. 6-9, 2007, ACM, New York, NY, USA, Nov. 6, 2007, pp. 29-42, XP058166289.

* cited by examiner

DEVICE AND METHOD FOR DETECTING MOVEMENT OF RADIO TAG

CROSS-REFERENCE TO RELATED APPLICATION

This application is based on and claims the benefit of priority from earlier Japanese Patent Application No. 2017-189510 filed Sep. 29, 2017, the description of which is incorporated herein by reference.

BACKGROUND

Technical Field

The present invention relates to a device and a method for detecting how a radio tag spatially moves.

Related Art

Currently, as a technology with respect to a radio tag movement detection device for detecting a movement state of a radio tag, for example, a tag reader disclosed in Patent Document 1 has been known. In the tag reader, a tag classification table is prepared in advance in which output intensity of a radio wave which becomes a limit of tag detection is defined as limit radio wave intensity and then the limit radio wave intensity and a detection distance are associated with each other according to tag classification, and when the tag is detected, a distance to the tag is calculated based upon a distance corresponding to the limit radio wave intensity by referring to the tag classification table according to the detected tag classification.

PATENT DOCUMENT

Patent Document 1: 2016-170046

The above information disclosed in this Background section is only to enhance the understanding of the background of the invention, and therefore it may contain information that does not form the prior art that is already known to a person of ordinary skill in the art.

Meanwhile, in a configuration of detecting a movement state of a radio tag by using the above-mentioned radio wave intensity, for example, when the radio tag moves at a low speed, and the like, there exists a case in which the movement of the radio tag may not be accurately detected. Therefore, in order to detect the movement state of the radio tag moving at the low speed with high accuracy, it is possible to adopt a method for detecting the movement state of the radio tag based upon a phase addition value obtained by calculating a phase difference of a response wave from the radio tag and by cumulatively adding the phase difference.

Meanwhile, when detecting the movement state of the radio tag by using the phase difference of the response wave from the radio tag in this way, there exists a case where a time zone in which the response wave can not be received therefrom may occur due to influences such as a surrounding environment, and the like. In this case, there exists case in which a phase to be measured next may be deviated by ±n (180°) due to phase rotation (aliasing), and when using the phase addition value that is obtained by cumulatively adding the phase difference calculated from the phase of which the deviation occurred in this way, the movement state of the radio tag is erroneously detected. Therefore, it is required to correct the phase of which the deviation occurred, however, since it is not possible to exactly find out which phase is deviated and how the phase is deviated, even a correct phase may be corrected, thereby resulting in a problem that the movement state of the radio tag may be erroneously detected due to the aforementioned correction.

SUMMARY

The present disclosure is directed to solving the above-mentioned problems. Further, as an object thereof, the present disclosure provides a configuration in which detection accuracy can be improved by preventing unnecessary correction with respect to detection of a movement state of a radio tag using a phase difference of a response wave from the radio tag.

In order to achieve the above-mentioned object, as one mode of the present disclosure is a radio tag movement detection device 10 for detecting a movement state of a radio tag, including:

phase measurement parts and configured to measure a phase $\varphi$ of a response wave from the radio tag;

a memory configured to sequentially store a phase measured by the phase measurement part together with a measurement time t at which the phase is measured;

a first calculation part configured to calculate a difference from a previous phase and a difference from a previous measurement time with respect to each phase stored in the memory as a phase difference $\Delta\varphi$ and a time difference $\Delta t$;

a second calculation part configured to calculate a phase addition value $\varphi$sum obtained by cumulatively adding a plurality of the phase differences so as to correct a phase difference in which the corresponding time difference among the plurality of the phase differences calculated by the first calculation part exceeds a predetermined threshold tsa; and a detection part 11 configured to detect the movement state of the radio tag based upon the phase addition value calculated by the second calculation part, wherein a required time when a phase measured by the phase measurement part is changed by n is obtained by a movement distance and a movement average speed of the radio tag, and the predetermined threshold is set to be equal to or less than half of the required time.

Further, the above-mentioned reference signs indicate a correspondence relationship with specific means described in the exemplary embodiments which will be described later.

In the present disclosure, a phase and a measurement time of a response wave from a radio tag measured by a phase measurement part are sequentially stored in a memory. Further, a difference from a previous phase and a difference from a previous measurement time with respect to each phase stored in the memory are calculated by a first calculation part as a phase difference and a time difference; and a phase addition value obtained by cumulatively adding a plurality of the phase differences is calculated by a second calculation part so as to correct a phase difference in which the corresponding time difference among the plurality of the phase differences calculated by the first calculation part exceeds a predetermined threshold, whereby the movement state of the radio tag is detected by the detection part based upon the calculated phase addition value. Additionally, a required time when a phase measured by the phase measurement part is changed by n is obtained by a movement distance and a movement average speed of the radio tag, and the predetermined threshold is set to be equal to or less than half of the required time.

When a phase can be measured with a time difference equal to or less than a half period of the required time by the sampling theorem, it can be determined that rotation of the phase (aliasing) does not occur. That is, in the case of a phase difference, the time difference of which is equal to or less than a predetermined threshold which is set to be equal to or less than the half period of the required time, since it can be determined that the rotation of the phase does not occur and the deviation of the phase does not also occur, the phase difference which can be determined that the deviation of the phase does not exist, is defined as a non-correction object, thereby making it possible to prevent unnecessary correction. Accordingly, detection accuracy can be improved by preventing the unnecessary correction with respect to the detection of the movement state of the radio tag using the phase difference of the response wave from the radio tag.

Another aspect of the present disclosure is directed to a radio tag movement detection method for detecting a movement state of a radio tag. The method is applied to a device comprising:

a phase measurement part configured to measure a phase of a response wave from the radio tag; and a memory configured to sequentially store a phase measured by the phase measurement part together with a measurement time at which the phase is measured.

In this case, the radio tag movement detection method includes:

first calculating a difference from a previous phase and a difference from a previous measurement time with respect to each phase stored in the memory as a phase difference and a time difference;

second calculating a phase addition value obtained by cumulatively adding a plurality of the phase differences so as to correct a phase difference in which the corresponding time difference among the plurality of the phase differences calculated by the first calculation step exceeds a predetermined threshold; and detecting a movement state of the radio tag based upon the phase addition value calculated by the second calculation step, wherein a required time when a phase measured by the phase measurement part is changed by n is obtained by a movement distance and a movement average speed of the radio tag, and the predetermined threshold is set to become equal to or less than half of the required time.

This detection method also provides the same advantages when being installed in the detection device.

DETAILED DESCRIPTION OF THE PREFERRED EMBODIMENTS

[First Exemplary Embodiment]

Hereinafter, a first exemplary embodiment, in which a conveyance management system provided with a tag reader according to the present invention is embodied, will be described with reference to the drawings.

Figure 1:
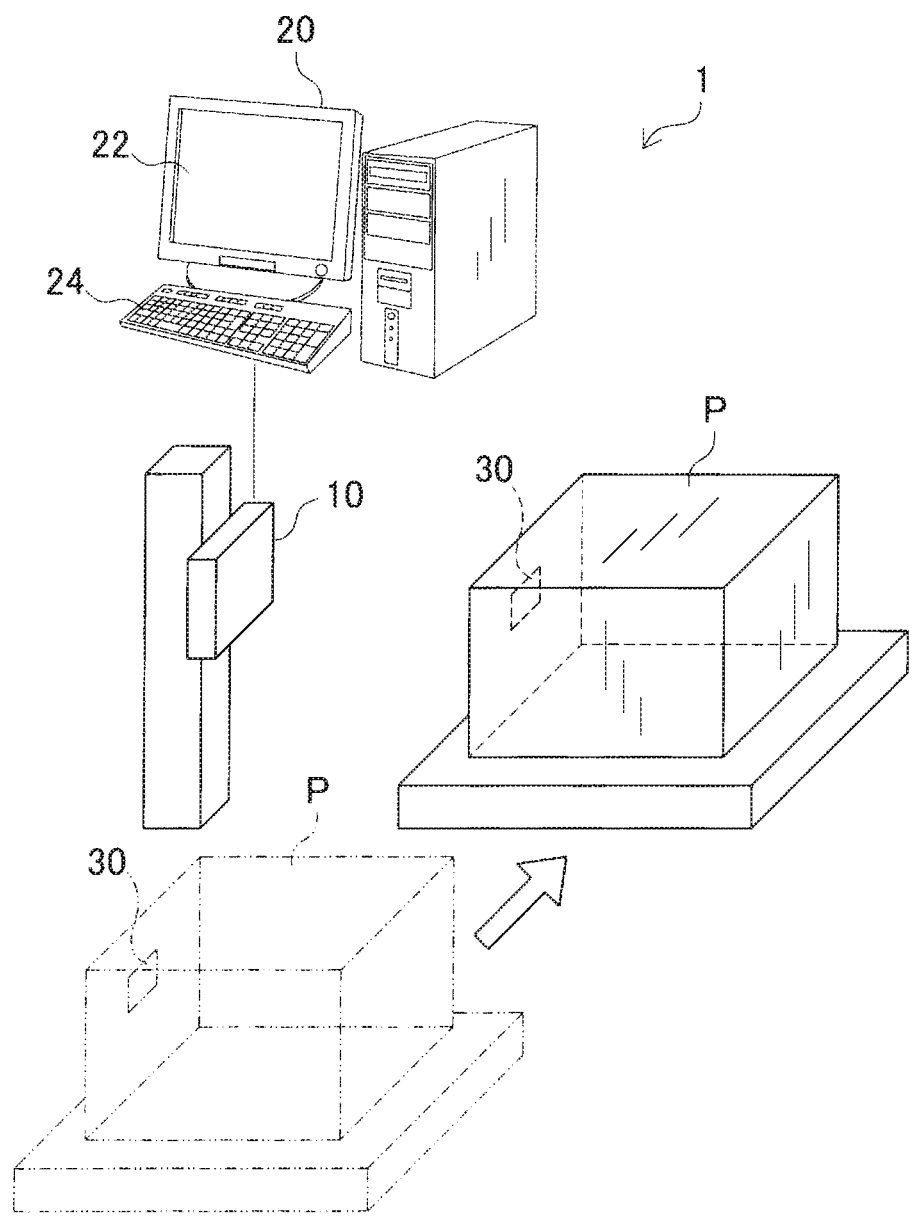
FIG. 1 is a diagram illustrating a schematic configuration of a conveyance management system according to a first exemplary embodiment.

A conveyance management system 1 shown in FIG. 1 is configured as a system in which detection is performed by a tag reader 10 functioning as a radio tag movement detection device for detecting a movement state of a radio tag 30 such as an RF tag, and the like attached to a conveyed article P such as a product, and the like, thereby managing the movement state, and the like of the conveyed article P to which the radio tag 30 is attached. The conveyance management system 1, as shown in FIG. 1, is provided with the tag reader 10 that reads the radio tag 30 disposed in a conveyance path where the conveyed article P to which the radio tag 30 is attached is conveyed; and a management device 20 that performs management with respect to the conveyed article P by using a read result, and the like by the tag reader 10.

The tag reader is configured by, for example, a well-known RF tag reader, as shown in FIG. 1, is installed in a gate provided in the conveyance path, and is configured to output information read from the radio tag 30, information on the movement state of the read tag 30, and the like to the management device 20.

Figure 2:
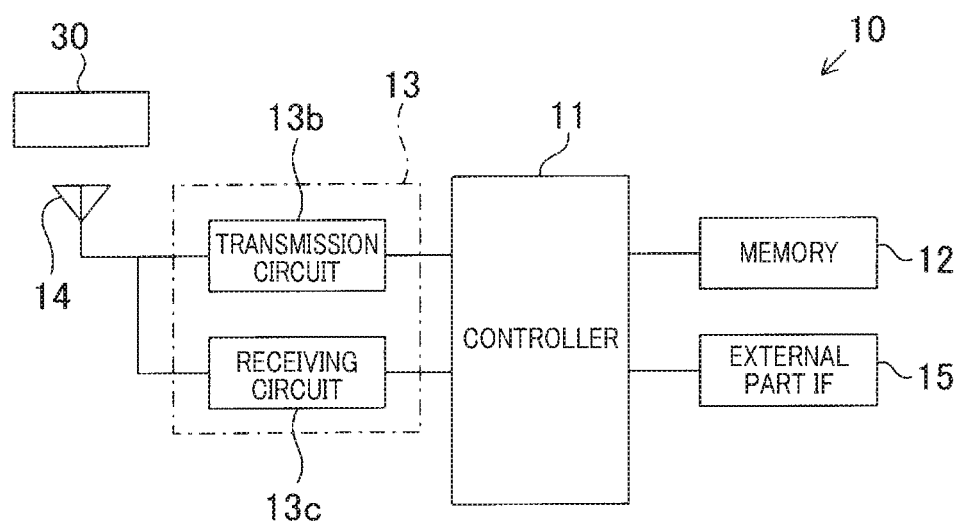
FIG. 2 is a block diagram illustrating an electrical configuration of a tag reader.

A hardware configuration of the tag reader 10 is, as shown in FIG. 2, provided with a controller 11, a memory 12, a communication processing part 13, an antenna 14, an external interface 15, and the like. The controller 11 is mainly configured with a known microcomputer (i.e., a computer system), includes a CPU, a system bus, an input/output interface, and the like, and is configured with an information processor together with the memory 12 formed of a semiconductor memory, and the like.

Further, the communication processing part 13 is, as shown in FIG. 2, provided with a transmission circuit 13b, a receiving circuit 13c, and the like. The transmission circuit 13b is configured by, for example, a carrier oscillator, an encoding part, a modulation part, an amplifier, and the like.

The carrier oscillator outputs a carrier (a carrier wave) of a predetermined frequency, and the encoding part is connected to the controller 11, thereby encoding transmission data output from the controller 11 and outputting the encoded data to the modulation part. The carrier (the carrier wave) from the carrier oscillator and the transmission data from the encoding part are inputted to the modulation part, and the modulation part generates a modulated signal which is ASK (Amplitude Shift Keying) modulated by an encoded transmission code (a modulated signal) outputted by the encoding part at the time of transmitting a command to a communication object with respect to the carrier (the carrier wave) outputted by the carrier oscillator. Further, the amplifier amplifies an input signal (a modulated signal which is modulated by the modulation part) at a set amplification rate, and is configured so that the amplification signal is outputted to the antenna 14 as a transmission signal.

Further, an input terminal of the receiving circuit 13c is connected to the antenna 14, and a radio wave signal (a receive signal) corresponding to a response wave from the radio tag 30 received by the antenna 14 is configured to be inputted to the receiving circuit 13c. The receiving circuit 13c is configured by, for example, the amplifier, a demodulation part, and the like, amplifies the received signal received by the antenna 14 by the amplifier, and demodulates the amplified signal by the demodulation part. Further, a signal corresponding to the demodulated signal waveform is outputted to the controller 11 as receiving data. A phase of the response wave of the radio tag 30 received in this manner is sequentially stored in the memory 12 by the controller 11 in association with the measurement time (receiving time). Further, the controller 11 and the communication processing part 13 may correspond to an example of a "phase measurement part".

Further, the external interface 15 is configured as an interface for performing data communication with external devices such as the management device 20, and the like, and is configured to perform communication processing in cooperation with the controller 11.

Here, an electrical configuration of the radio tag 30 which becomes an object to be read by the tag reader 10 will be described with reference to FIG. 3.

Figure 3:
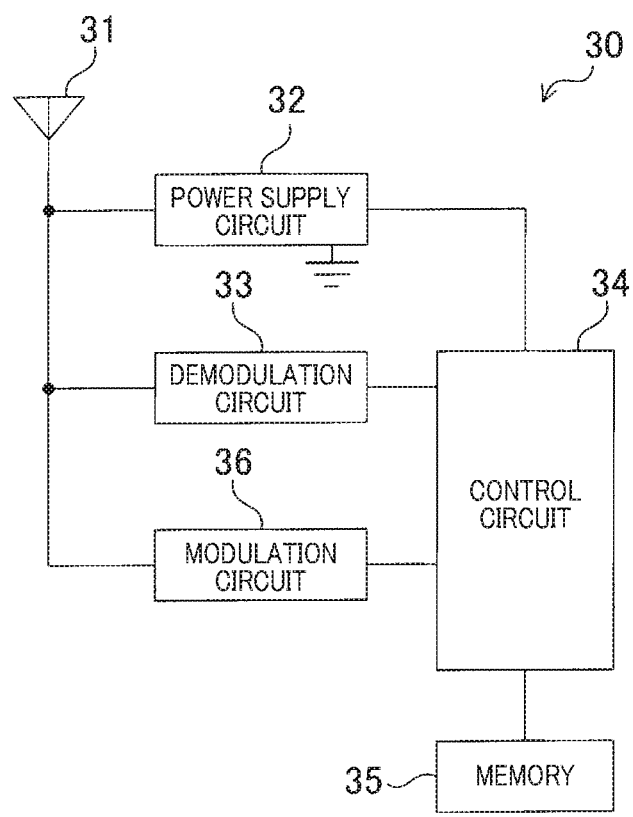
FIG. 3 is a block diagram illustrating an electrical configuration of a radio tag.

As shown in FIG. 3, the radio tag 30 is configured by an antenna 31, a power supply circuit 32, a demodulation circuit 33, a control circuit 34, a memory 35, a modulation circuit 36, and the like. The power supply circuit 32 rectifies and smoothens a transmission signal (a carrier signal) from the tag reader 10 received via the antenna 31, thereby generating a power supply for operation, and the power supply for the operation is supplied to respective components including the control circuit 34.

Further, the demodulation circuit 33 demodulates data superimposed on the transmission signal (the carrier signal) and outputs the demodulated data to the control circuit 34. The memory 35 is configured by various types of semiconductor memories such as a ROM, an EEPROM, and the like, and identification information (a tag ID) for identifying a control program and the radio tag 30 or data corresponding to the use of the radio tag 30 are stored. The control circuit 34 is configured to read out the information or data from the memory 35 and configured to output the read information or the read data as transmission data to the modulation circuit 36, and the modulation circuit 36 is configured to apply load modulation to the response signal (the carrier signal) with the transmission data and configured to transmit the load-modulated response signal as a response wave from the antenna 31. The control circuit 34 is also provided, as one of main components, a known microcomputer including a CPU, which provides the foregoing input and output functions. Further, in FIGS. 2 and 3, one example of the electrical configuration of the tag reader 10 and the radio tag 30 is described, but other well-known electrical configurations may be used as long as the configurations are capable of performing wireless communication using electromagnetic waves.

Hereinafter, a configuration of the management device 20 will be described.

Figure 4:
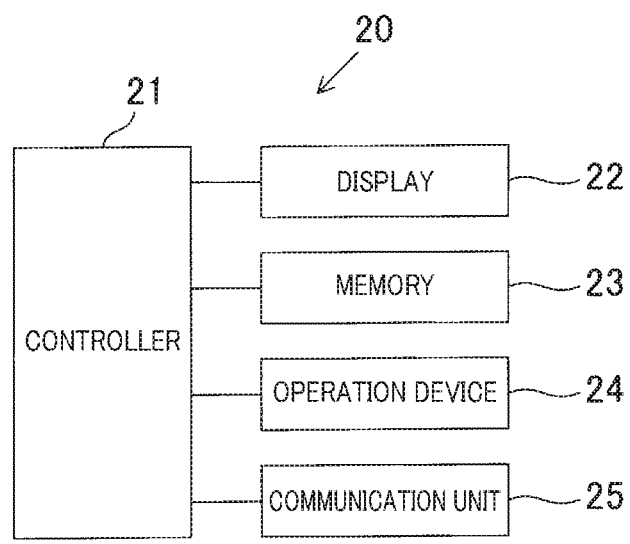
FIG. 4 is a block diagram illustrating an electrical configuration of a management device.

The management device 20 functions as a device that manages a conveyance state of the conveyed article P by using the read result of each radio tag 30 acquired from the tag reader 10, and information acquired from the outside. The management device 20 is configured as, for example, a computer, and, as shown in FIG. 4, is provided with a controller 21 which includes a CPU, and the like, a display 22 configured as a liquid crystal monitor, and the like; a memory 23 formed of a ROM, a RAM, an HDD, and the like; an operation device 24 configured as a mouse, a keyboard, and the like; and a communication unit 25 configured as a communication interface for performing data communication between the external devices such as the tag reader 10, a host device, and the like.

Next, tag detection processing performed by the controller 11 at the time when the movement state of the radio tag 30 is detected by using the tag reader 10 will be described.

In order to accurately detect the movement state of the radio tag 30 even though the radio tag 30 moves at a low speed, the tag reader 10 according to the exemplary embodiment detects the movement state of the radio tag 30 by using phase differences of the response waves from the radio tag 30. Specifically, a phase $\varphi$ of the response wave from the radio tag 30 measured for a predetermined time is stored in the memory 12 in association with the measurement time (receiving time) t by using the communication processing part 13 according to measurement processing separately performed by the controller 11. Then, in tag detection processing performed by the controller 11, the phase $\varphi$ of the response wave and the measurement time i thereof stored in the memory 12 are read out, and a distance to the radio tag 30 is measured based upon a phase addition value $\varphi$ sum obtained by cumulatively adding the phase difference $\Delta\varphi$ calculated based upon the phases $\varphi$, thereby detecting the movement state of the radio tag 30.

As described above, when receiving the response wave from the radio tag 30, there exists a case in which a time zone where the response wave from the radio tag 30 which has been consecutively received cannot be received may occur due to a surrounding environment such as a reflector around the conveyance path. When such a time zone occurs, a phase to be measured next may be deviated by ±n (180°) due to phase rotation (aliasing), so it is required to cumulatively add the phase difference so as to correct the deviation of the phase. For example, even in a case where the radio tag 30 is actually moved, when the phase difference becomes small due to the deviation of the phase generated by the rotation of the phase, there is a possibility of erroneously detecting that the radio tag 30 is stopped.

Figure 5A:
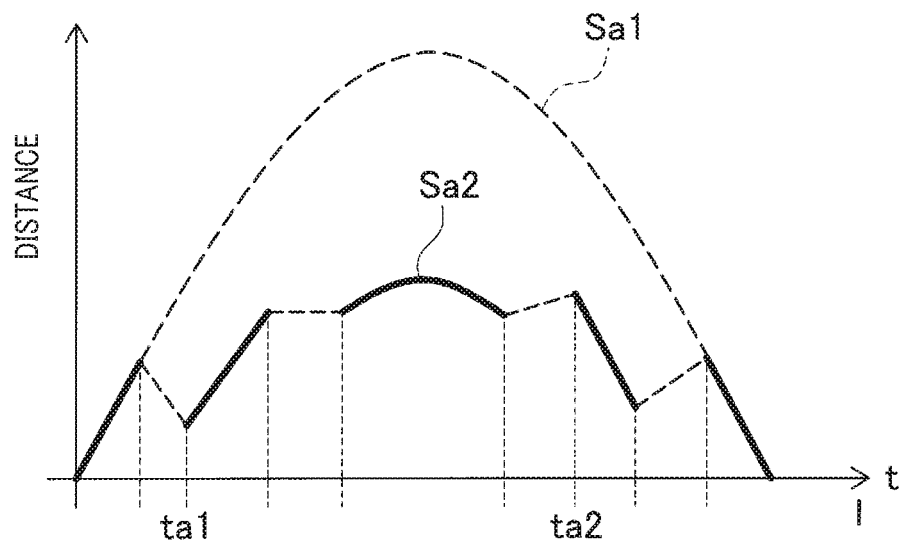
FIG. 5A is a diagram illustrating comparison between a movement state of a radio tag measured based upon a non-corrected phase difference and an actual movement state of a radio tag.

When the distance to the radio tag 30 is calculated based upon the phase addition value obtained by cumulatively adding the phase difference without correcting the deviation of the phase generated by the rotation of the phase, for example, as shown in FIG. 5A, the movement state of the radio tag 30 to be measured (refer to a reference sign Sa2 in FIG. 5) abruptly changes from a previous measurement time at time ta1 and time ta2 at which the deviation of the phase occurs, with respect to an actual movement state of the radio tag 30 (refer to a reference sign Sa1 in FIG. 5).

Therefore, assuming that a movement speed of the radio tag 30 does not largely change since the phase is measured in a minute time, in consideration of the possibility that the phase may be deviated by ±n (rad), correction is performed so as to become a phase which becomes the closest to a speed at a phase measured last time, among three speeds of a speed of a case in which the phase is not deviated; a speed of a case in which the phase is deviated by +n; and a speed of a case in which the phase is deviated by −n. That is, an i-th phase addition value φsum[i] can be calculated by the following equation (1) based upon a phase difference Δφ[i]. Further, as an aliasing determination coefficient, a[i] is set to 0 when a correction, which will be described later, is not required, set to +1 when a correction is required on the assumption that the phase is deviated by +n, and set to −1 when a correction is required on the assumption that the phase is deviated by −n.

$$\Phi sum[i] = \varphi sum[i-1] + \Delta\varphi[i] + n \times a[i] \quad (1)$$

Then, an i-th speed v[i] can be calculated by the following equation (2) based upon distance displacement Δl[i] calculated from the phase difference Δφ[i] and a propagation constant β, and a time difference Δt[i].

$$V[i] = \Delta l[i]/\Delta t[i] = (\Delta\varphi[i]/\beta)/\Delta t[i] \quad (2)$$

Further, the propagation constant β can be calculated by the following equation (3) based upon a wavelength λ(=c/f) calculated from a communication frequency f and a light speed c of the electromagnetic wave.

$$\beta = 2\pi/\lambda \quad (3)$$

Figure 5B:
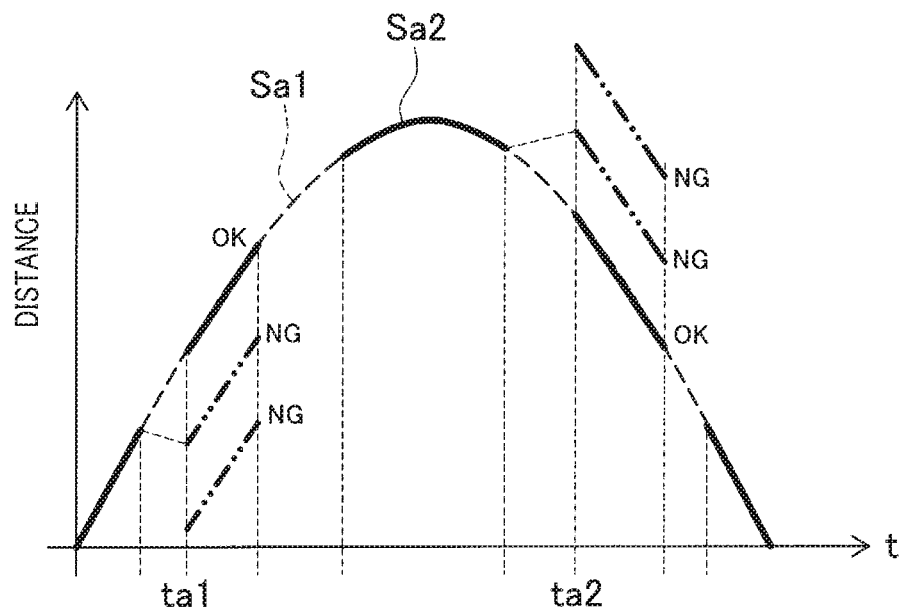
FIG. 5B is a diagram illustrating comparison between a movement state of a radio tag measured based upon a corrected phase difference by using a speed and an actual movement state of a radio tag.

Accordingly, the deviation of the phase at the time ta1 of FIG. 5A is corrected and the phase difference is cumulatively added, and further, the deviation of the phase at the time ta2 is corrected and the phase difference is cumulatively added, whereby correction is performed as shown in FIG. 5B, and a movement state Sa2 of the measured radio tag 30 is corrected so as to approach an actual movement state Sa1 of the radio tag 30.

Meanwhile, in the processing in which the above-mentioned correction for all the phases is performed, for example, when a time change of the phase occurs even a little when the radio tag 30 is stationary, there exists a case in which the phase addition value is calculated so that the accurate phase difference is erroneously corrected.

Here, in the tag detection processing in the exemplary embodiment, the detection accuracy relating to the radio tag 30 is improved by determining whether or not the correction is necessary so that a reliable phase is not corrected, without considering all of the phases as objects to be corrected. Specifically, as a first correction necessary/unnecessary determination method, a predetermined threshold is calculated from a time difference in which it can be determined that the rotation of the phase (aliasing) does not to occur, and a phase difference corresponding to the time difference equal to or less than the predetermined threshold is defined as a non-correction object. Further, In the exemplary embodiment, the phase difference corresponding to the time difference equal to or less than the predetermined threshold is described as a dense phase difference, and a phase difference corresponding to the time difference exceeding the predetermined threshold is described as a sparse phase difference.

Specifically, in the exemplary embodiment, the predetermined threshold (hereinafter referred to as a time threshold tsa[i]) is set as follows.

On the condition of an average speed v(ave) near the i-th radio tag 30, with respect to the radio tag 30, when a pseudo frequency of a waveform, where a horizontal axis becomes a movement distance of the radio tag 30 and a vertical axis becomes a phase thereof, is defined as f=1/(λ/v), since the time required for moving a movement distance λ/4 of the radio tag 30 at the time when the phase is changed by π (180°) at the average speed v(ave)/2 is reciprocal communication, λ/{2×v(ave)} is obtained. Further, the average speed v(ave) is calculated as a movement average speed of the radio tag 30 from a speed calculated from the dense phase difference close in time and the sparse phase difference close in time, whereby the calculation can be performed according to an average value of speeds with high reliability.

Then, when the phase can be measured with a time difference which is equal to or less than a half period of the required time by the sampling theorem, since the measured phase is not deviated by ±π(rad) from the phase measured last time, it can be determined that the rotation of the phase does not occur. Therefore, the time threshold tsa[i] which is the time difference in which it can be determined that the rotation of the phase does not to occur can be obtained by the following equation (4), and the phase difference Δφ[i] corresponding to the time difference Δt[i] which is equal to or less than the time threshold tsa[i] is defined as the non-correction object.

$$tsa[i] = \lambda/\{2 \times v(ave)\}/2 = \lambda/\{4 \times v(ave)\} \quad (4)$$

However, an initial value of the time threshold tsa[i] is required to be set as the maximum speed assumed in advance, and is set to a conveyance limit speed of the conveyed article P with respect to the radio tag 30 attached to the conveyed article P as described above. For example, when the conveyance limit speed of a forklift conveying the conveyed article P is 6 km/h (1.67 m/s), a communication frequency f thereof is 920 MHz, and a wavelength λ thereof is 0.32 m, the initial value of the time threshold tsa[i] is set by the following equation (5) as shown in FIG. 5.

$$tsa[i] = 0.32/\{4 \times (2 \times 1.67)\} = 24 \text{ ms} \quad (5)$$

Further, as a second correction necessary/unnecessary determination method, even in the case of the sparse phase difference, the sparse phase difference, in which the average speed v(ave) calculated from the dense phase difference of which the time is close to the sparse phase difference becomes equal to or less than a predetermined speed threshold vmin, is defined as the non-correction object. The speed calculated from the dense phase difference can be determined as a reliable numerical value, and when an average value of a plurality of the reliable speeds is low, it can be determined that the radio tag 30 moves at the low speed or is stationary.

Therefore, in the exemplary embodiment, the predetermined speed threshold vmin is set according to the speed of the radio tag 30 at the time when the radio tag 30 moves at the low speed, such that even the sparse phase difference, in which the average speed v(ave) calculated from two or more dense phase differences of which the times are closed to the sparse phase difference becomes equal to or less than the predetermined speed threshold vmin, is determined not to generate the deviation of the phase and is determined to be highly reliable because the radio tag 30 moves at the low speed or is stationary, thereby defining the sparse phase difference as the non-correction object.

Figure 6A:
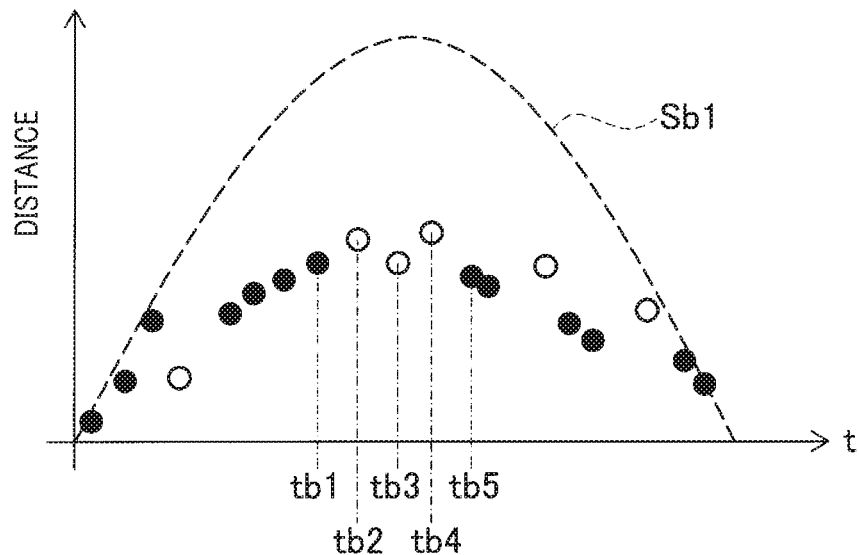
FIG. 6A is a diagram illustrating a distribution state between a distance calculated from a dense phase difference and a distance calculated from a sparse phase difference before correction.
Figure 6B:
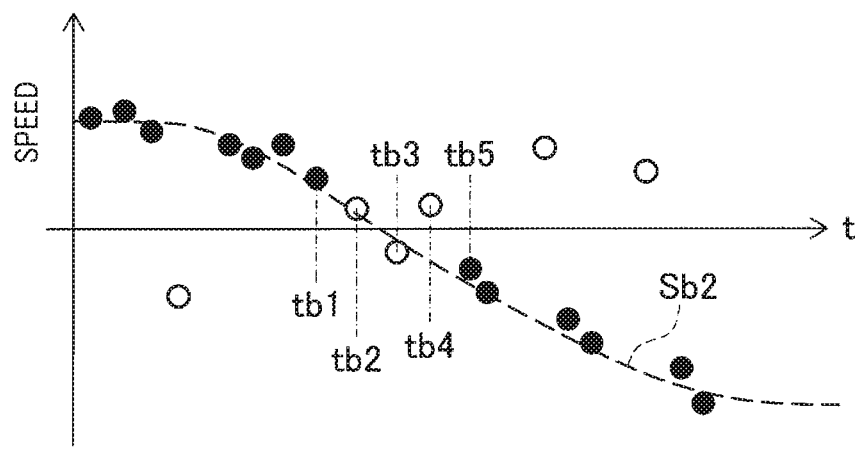
FIG. 6B is a diagram illustrating a distribution state between a speed calculated from a dense phase difference and a speed calculated from a sparse phase difference before correction.
Figure 6C:
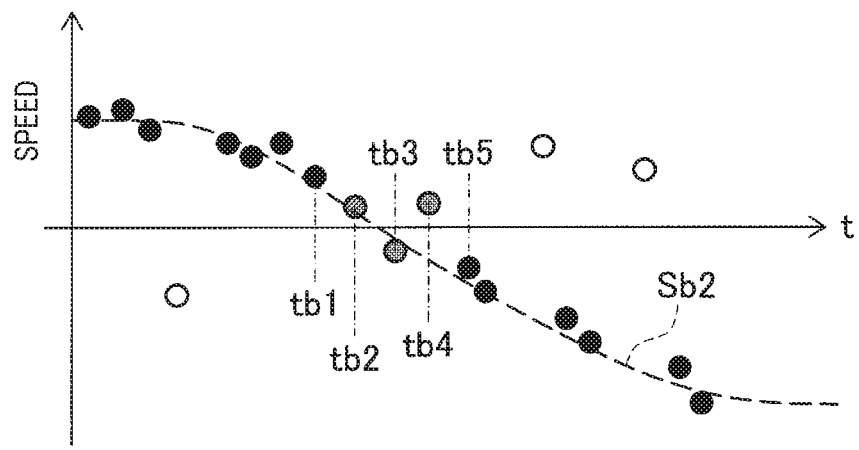
FIG. 6C is a diagram illustrating a speed calculated from a sparse phase difference which becomes a non-correction object in FIG. 6B.

For example, as shown in FIG. 6A, when a distance calculated from a dense phase difference (refer to black circles in FIG. 6) and a distance calculated from a sparse phase difference before the correction (refer to white circles in FIG. 6) are calculated, a speed calculated from each phase difference is calculated as shown in FIG. 6B. In this case, at time tb1 and time tb5 which become before and after time tb2, time tb3, and time tb4 at which a speed is calculated from the sparse phase difference, an average speed v(ave) which is an average value of speeds vb1 and vb5 respectively calculated from the dense phase difference becomes equal to or less than the predetermined speed threshold vmin, whereby it is determined that the deviation of the phase does not occur because the radio tag 30 moves at the low speed or is stationary, and the sparse phase differences of the time tb2, the time tb3, and the time tb4 also become the non-correction object (refer to circles with hatching in FIG. 6C). Further, a broken line Sb1 in FIG. 6A indicates the actual movement state of the radio tag 30, and broken lines Sb2 in FIG. 6B and FIG. 6C indicate actual change states of the speeds of the radio tag 30.

Further, as a third correction necessary/unnecessary determination method, even in the case of the sparse phase difference, a sparse phase difference, in which a sign of a speed calculated from a dense phase difference which is previously measured and of which the time becomes the closest and a sign of a speed calculated from a dense phase difference which is measured afterwards and of which the time becomes the closest are different from each other, is defined as the non-correction object. When the signs of the speeds calculated from the reliable dense phase differences are different from each other, the radio tag 30 can be determined as immediately before and after a direction change and immediately before and after a stop.

Therefore, in the exemplary embodiment, even in the case of the sparse phase difference, in which the sign of the speed calculated from the dense phase difference which is previously measured and of which the time becomes the closest and the sign of the speed calculated from the dense phase difference which is measured afterwards, and of which the time becomes the closest are different from each other, since the radio tag 30 is in a state of being immediately before and after the stop, the speed of the radio tag 30 is low such that it is determined that the deviation of the phase does not occur and the reliability is high, thereby being defined as the non-correction object.

Figure 7A:
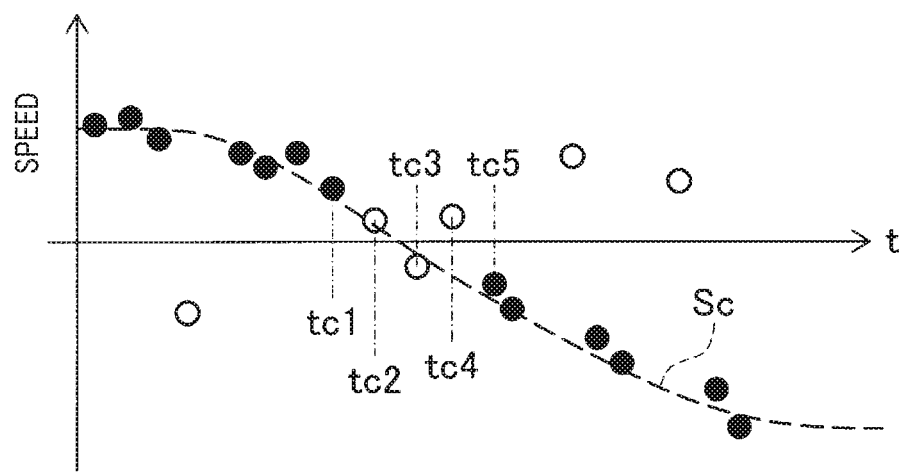
FIG. 7A is a diagram illustrating a distribution state between a speed calculated from a dense phase difference and a speed calculated from a sparse phase difference before correction when detecting a moving radio tag.
Figure 7B:
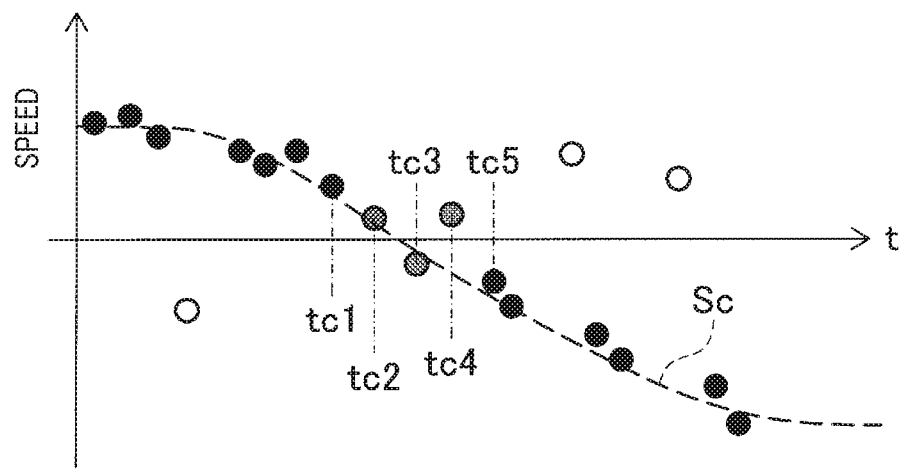
FIG. 7B is a diagram illustrating a speed calculated from a sparse phase difference which becomes a non-correction object in FIG. 7A.

For example, as shown in FIG. 7A, it is assumed that when the moving radio tag 30 is detected, a speed calculated from the dense phase difference (refer to black circles in FIG. 7) and a speed calculated from the sparse phase difference before correction (refer to white circles in FIG. 7) are calculated. In this case, at time tc1 and time tc5 which become before and after time tc2, time tc3, and time tc4 at which a speed is calculated from the sparse phase difference, since a sign of a speed vc1 and a sign of a speed vc5 respectively calculated from the dense phase difference are different from each other and thus the radio tag 30 is in a state of being immediately before and after a stop, a speed thereof is low such that it is determined that the deviation of the phase does not occur, whereby the sparse phase differences of the time tc2, the time tc3, and the time tc 4 also become the non-correction object (refer to circles with hatching in FIG. 7B). Further, broken lines Sc in FIG. 7A and FIG. 7B indicate actual change states of the speed of the radio tag 30.

For example, as shown in FIG. 7A, it is assumed that when the moving radio tag 30 is detected, a speed calculated from the dense phase difference (refer to black circles in FIG. 7) and a speed calculated from the sparse phase difference before correction (refer to white circles in FIG. 7) are calculated. In this case, at time tc1 and time tc5 which become before and after time tc2, time tc3, and time tc4 at which a speed is calculated from the sparse phase difference, since a sign of a speed vc1 and a sign of a speed vc5 respectively calculated from the dense phase difference are different from each other and thus the radio tag 30 is in a state of being immediately before and after a stop, a speed thereof is low such that it is determined that the deviation of the phase does not occur, whereby the sparse phase differences of the time tc2, the time tc3, and the time tc4 also become the non-correction object (refer to circles with hatching in FIG. 7B). Further, broken lines Sc in FIG. 7A and FIG. 7B indicate actual change states of the speed of the radio tag 30.

Further, as a fourth correction necessary/unnecessary determination method, among a plurality of the sparse phase differences, a phase difference in which a corresponding time difference becomes greater than a second threshold which is set to be greater than the predetermined threshold is defined as the non-correction object. In a case where the time difference slightly exceeds the predetermined threshold, even though the correction based upon a speed can be performed on the assumption that a difference between a speed calculated from a previous dense phase difference and a speed calculated from a current sparse phase difference is small, when a time difference becomes equal to or greater than the second threshold, thereby largely exceeding the predetermined threshold, the difference between the previous speed calculated from the previous dense phase difference and the current speed calculated from the current sparse phase difference becomes large, whereby there exists a possibility that correction accuracy based upon the speed may deteriorate.

Therefore, in the exemplary embodiment, the sparse phase difference, in which the corresponding time difference becomes equal to or greater than the second threshold, is defined as the non-correction object, thereby preventing the correction based upon the speed having low reliability. In the exemplary embodiment, the second threshold is set as a time threshold tlim[i], for example, set as twice the time threshold tsa[i], thereby defining the sparse phase difference in which the time difference $\Delta t[i]$ exceeds one period as the non-correction object.

Next, the tag detection processing which adopts the above-mentioned respective correction necessary/unnecessary determination methods will be described with reference to a flow chart in FIG. 9. In the following description, a case in which a phase addition value as shown in FIG. 10 is calculated before correction by the measurement processing separately performed by the controller 11 will be described in detail. Further, even in FIG. 10, the dense phase difference is shown by black circles, and the sparse phase difference is shown by white circles.

Figure 9:
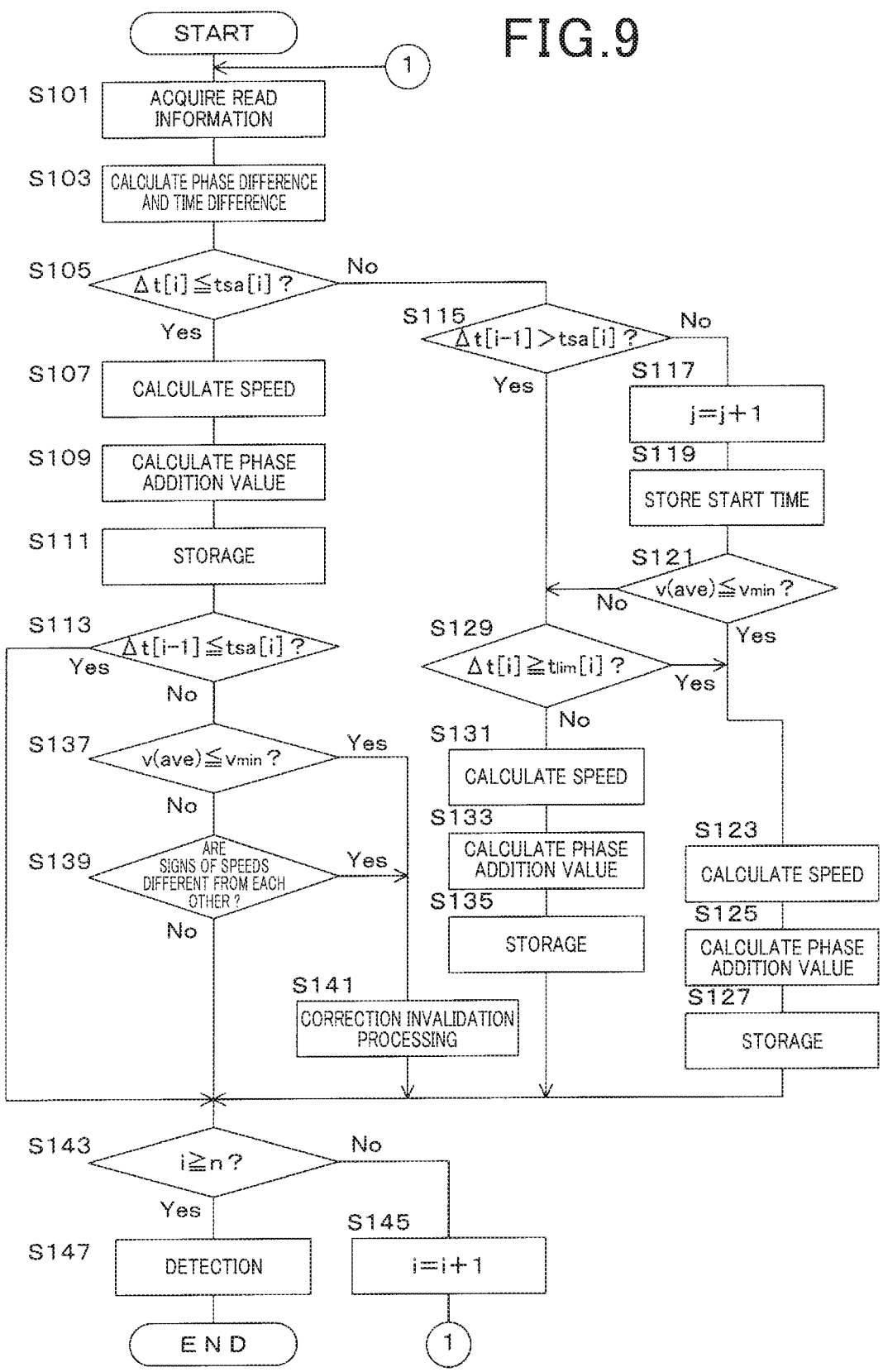
FIG. 9 is a flow chart illustrating a flow of tag detection processing performed in a controller of a tag reader.
Figure 10:
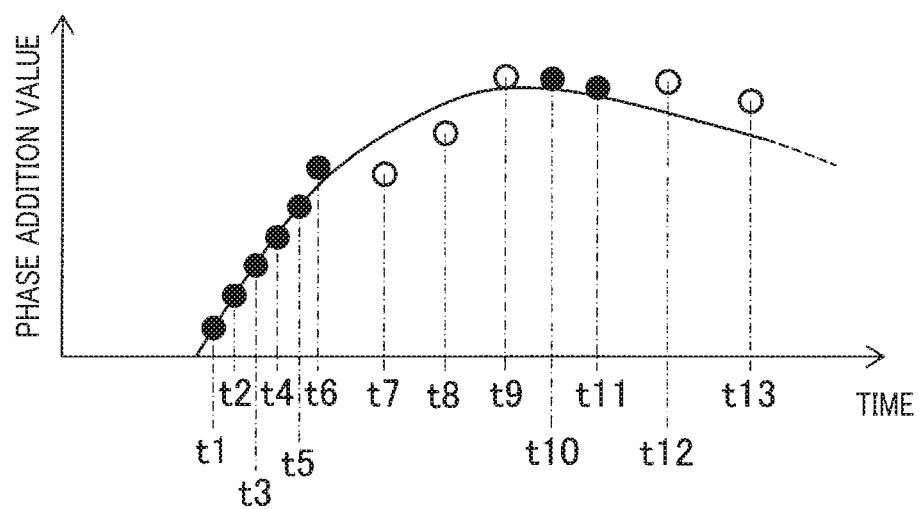
FIG. 10 is a diagram illustrating a time change of a phase addition value before correction.

When the tag detection processing is started by the controller 11, an i-th phase $\varphi[i]$ and a measurement time t[i] are read out from the memory 12 at step S101 in FIG. 9, and a phase difference $\Delta\varphi[i]$ and a time difference $\Delta t[i]$ are calculated at step S103. Particularly, the phase difference Δφ[i] is converted (corrected) so as to be a value between −π/2 and π/2. Further, the controller 11 for calculating the phase difference Δφ[i] and the time difference Δt[i] can correspond to one example of a "first calculation part".

Next, determination processing at step S105 is performed, and it is determined whether or not the time difference Δt[i] is equal to or less than the time threshold tsa[i] calculated as described above. Here, since a time zone where the response wave from the radio tag 30 can not be received does not occur as shown at time t1 to time t6 in FIG. 10 and the phase is consecutively measured, when the time difference Δt[i] becomes equal to or less than the time threshold tsa[i] at the step S105 (Yes), it is determined that a dense phase difference is calculated, and a speed v[i] is calculated based upon the phase difference Δφ[i], the time difference Δt[i], and the like calculated as described above by the equation (2) at step S107. Then, when an aliasing determination coefficient a[i] is set to 0 and a phase addition value φsum[i] is calculated based upon the equation (1) at step S109, the phase addition value φsum[i], the speed v[i], and the aliasing determination coefficient a[i] are stored in the memory 12 at step S111.

Next, it is determined whether or not a previous time difference Δt[i−1] is equal to or less than the time threshold tsa[i] in determination processing at step S113. Here, since the dense phase differences are respectively calculated as shown at the time t1 to the time t6 in FIG. 10, and when the previous time difference Δt[i−1] becomes equal to or less than the time threshold tsa[i] at the step S113 (yes), it is determined that the dense phase difference is consecutively calculated and the phase difference Δφ[i] is a reliable value, thereby becoming the non-correction object. Then, when the measured number of all of the phase differences calculated from the phase φ[i] measured at the predetermined time is defined as n, and the phase addition value φsum[i], and the like are not calculated up to the n-th at step S143 (No), i is incremented (i=i+1) at step S145 and the processing from the step S101 is performed.

Next, when the phase φ[i] of the seventh (i=7) and the time t[i] are read out from the memory 12 in FIG. 10 at the step S101, the phase difference Δφ[i] and the time difference Δt[i] are calculated at the step S103, and the time difference Δt[i] exceeds the time threshold tsa[i] at the step S105 (No), from which it is determined that the sparse phase difference is calculated. Further, it is determined whether or not the previous time difference Δt[i−1] exceeds the time threshold tsa[i] in determination processing at step S115. Here, the Δt[i−1] which becomes a time difference at the previous time t6 is equal to or less than the time threshold tsa[i] at the step S115 (No), from which when it is determined that the sparse phase difference starts, j that indicates a section, in which the sparse phase difference is calculated at the time when a section in which the sparse phase difference is calculated and a section in which the dense phase difference is calculated are divided, is incremented (j=j+1) at step S117. Then, the start time te[j] is set to be equal to the time t[i](in this example, i=7) and then is stored in the memory 12 at step S119.

Next, in determination processing at step S121, it is determined whether or not an average speed v(ave) which is an average value of speeds calculated from two or more dense phase differences Δφ[i] of which the times are close to the sparse phase difference becomes equal to or less than the predetermined speed threshold vmin. In the exemplary embodiment, when it is determined that the sparse phase difference starts, the average speed v(ave) is calculated as an average value between a speed calculated from one previous dense phase difference Δφ[i−1] and a speed calculated from the second previous dense phase difference Δφ[i−2]. As described above, when it is determined that a phase difference Δφ[i] at time t7 is the start of the sparse phase difference, the average speed v(ave) is calculated as an average value between v[i−1] which becomes a speed at one previous time t6 and v[i−2] which becomes a speed at the second previous time t5. Then, when the calculated average speed v(ave) calculated in this manner is equal to or less than the predetermined speed threshold vmin at the step S121 (Yes), since the radio tag 30 moves at the low speed or is stationary, it is determined that the deviation of the phase does not occur and the reliability is high, thereby being defined as the non-correction object. Further, when the average speed v(ave) exceeds the predetermined speed threshold vmin at the S121 (No), processing after step S129 which will described later is performed.

As described above, in the case of the non-correction object, when the speed v[i] is calculated based upon the phase difference Δφ[i], the time difference Δt[i], and the like at step S123, the aliasing determination coefficient a[i] is set to 0, and the phase addition value φsum[i] is calculated based upon the equation (1) at step S125, the phase addition value φsum[i], the speed v[i], and the aliasing determination coefficient a[i] are stored in the memory 12 at step S127. Then, since the phase addition value φsum[i], and the like are not calculated up to the n-th at step S143 (No), i is incremented (i=i+1) at the step S145, and processing is performed from the aforementioned step S101.

Then, in FIG. 10, when the phase φ[i] of the eighth (i=8) and the time t[i] are read out from the memory 12 at the step S101, the phase difference Δφ[i] and the time difference Δt[i] are calculated at the step S103, and the time difference Δt[i] exceeds the time threshold tsa[i] at the step S105 (No), whereby it is determined that the sparse phase difference is calculated. Then, when the Δt[i−1] which becomes the time difference at the previous time t7 also exceeds the time threshold tsa[i] at the step S115 (Yes) and the sparse phase difference is determined to be continuous, the determination processing at the step S129 is performed, and it is determined whether or not the time difference Δt[i] is equal to or greater than the time threshold tlim[i] calculated as described above.

Here, when the time difference Δt[i] is equal to or less than the time threshold tlim[i] at the step S129 (No), it is determined that correction using the speed is possible, and the speed v[i] is calculated at step S131, after which processing at step S133 is performed. In this processing, as described in FIG. 5, in consideration of the possibility that the phase may be deviated by ±π, the correction is performed so as to become a phase which becomes the closest to a speed at a phase measured last time, among three speeds of a speed of a case in which the phase is not deviated; a speed of a case in which the phase is deviated by +π; and a speed of a case in which the phase is deviated by −π. Then, based upon the equation (1), the phase addition value φsum[i] is calculated so as to correct the phase difference according to the correction. Further, the controller 11 for calculating the phase addition value φsum[i] can correspond to one example of a "second calculation part" at the steps S133, S109, and the like.

At this time, in the case of the aliasing determination coefficient a[i], when the phase is not deviated, it is set that a[i]=0, and when the correction is required on the assumption that the phase is deviated by +π, it is set that a[i]=+1. Further, when the correction is required on the assumption that the phase is deviated by −π, it is set that a[i]=−1. Then, the phase addition value φsum[i], the speed v[i], and the aliasing determination coefficient a[i] are stored in the memory 12 at step S135. Then, since the phase addition value φsum[i], and the like are not calculated up to the n-th at step S143 (No), i is incremented (i=i+1) at the step S145, and processing is performed from the aforementioned step S101.

Next, even in the case of the phase difference Δφ[i] of the ninth (i=9) in FIG. 10, the phase addition value φsum[i], and the like are calculated and stored in the same manner as that of the eighth phase difference which is the same sparse phase difference.

Then, in FIG. 10, when the phase φ[i] of the tenth (i=10) and the time t[i] are read out from the memory 12 at the step S101, the phase difference Δφ[i] and the time difference Δt[i] are calculated at the step S103, and the time difference Δt[i] is equal to or less the time threshold tsa[i] at the step S105 (Yes), whereby it is determined that the dense phase difference is calculated. Next, the aliasing determination coefficient is set as a[i]=0, the speed v[i] and the phase addition value φsum[i] are calculated at the steps S107 and S109, and are stored in the memory 12 at the step S111.

Next, in the determination processing at the step S113, it is determined whether or not the previous time difference Δt[i−1] is equal to or less than the time threshold tsa[i], after which since the Δt[i−1] which becomes a time difference at the previous time t9 exceeds the time threshold tsa[i], "No" is determined.

In this case, it is determined that the dense phase difference starts, and, in determination processing of step S137, it is determined whether or not an average speed v(ave) which is an average value between the speed v[i] calculated as described above and a speed calculated from a dense phase difference of the time which is close to the previous dense phase difference is equal to or less than the predetermined speed threshold vmin. In an example of FIG. 10, on the assumption that i=10, an average speed v(ave) is calculated as an average value of a speed v[i] and a speed v[i−4]. Then, when the average speed v(ave) calculated described as above is equal to or less than the predetermined speed threshold vmin at the step S137 (Yes), since the radio tag 30 moves at the low speed or is stationary, it is determined that the deviation of the phase does not occur and the reliability is high, thereby performing correction invalidation processing shown at step S141.

In this processing, the correction processing performed for the sparse phase difference up to the dense phase difference of which the time is close to the previous the dense phase difference is invalidated, whereby the processing after the step S123 is performed instead of performing the processing after the step S131. In the example of FIG. 10, if the phase addition value φsum[i], and the like are corrected for i=7 to 9, the corrections are invalidated, and the processing after the step 123 is performed.

Figure 8A:
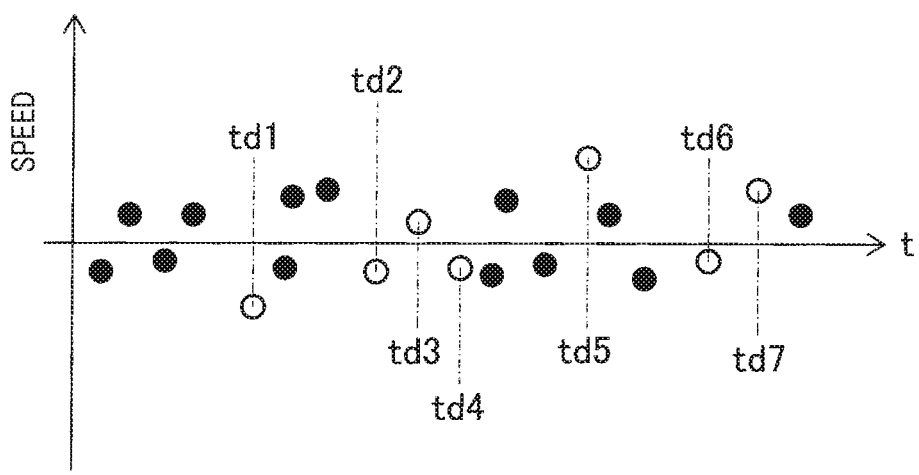
FIG. 8A is a diagram illustrating a distribution state between a speed calculated from a dense phase difference and a speed calculated from a sparse phase difference before correction when detecting a stationary radio tag.
Figure 8B:
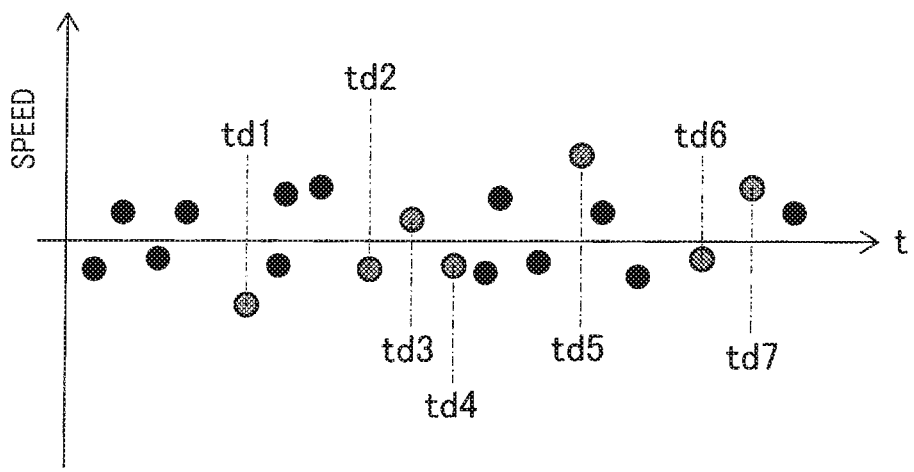
FIG. 8B is a diagram illustrating a speed calculated from a sparse phase difference which becomes a non-correction object in FIG. 8A.

Further, even when the average speed v(ave) exceeds the predetermined speed threshold vmin at the step S137 (No), in determination processing at step S139, it is determined whether or not the sign of the speed v[i] calculated as described above is different from the sign of the speed calculated from the dense phase difference of which the time is close to the previous dense phase difference. In the example of FIG. 10, on the assumption that i=10, it is determined whether or not the sign of the speed v[i] and the sign of the speed v[i−4] are different from each other. Here, as shown in FIGS. 7 and 8, when the signs of the speeds are different from each other at the step S139 (Yes), since the radio tag 30 is in a state of being immediately before and after a direction change and immediately before and after a stop, it is determined that the deviation of the phase does not occur and the reliability is high, thereby performing the processing of the step S141.

On the other hand, when the average speed v(ave) which is the average value between the speed v[i] calculated as described above and the speed calculated from the dense phase difference of which the time is close to the previous dense phase difference exceeds the predetermined speed threshold vmin at the step S137 (No), and the signs of the both speeds coincide with each other at the step S139 (No), the correction invalidation processing is not performed as the correction object, and the processing after the step S143 is performed.

Next, even in the case of the phase difference Δφ[i] of the eleventh (i=11) in FIG. 10, the phase addition value φsum[i], and the like are calculated and stored in the same manner as that of the tenth phase difference which is the same dense phase difference. Further, with respect to a phase difference Δφ[i] of the twelfth (i=12) in FIG. 10, the phase addition value φsum[i], and the like are calculated and stored in the same manner as that of the seventh phase difference from which the same sparse phase difference starts.

Then, in FIG. 10, when the phase φ[i] of the thirteenth (i=13) and the time t[i] are read out from the memory 12 at the step S101, the phase difference Δφ[i] and the time difference Δt[i] are calculated at the step S103, and the time difference Δt[i] exceeds the time threshold tsa[i] at the step S105 (No), whereby it is determined that the sparse phase difference is in process of being calculated. Then, in the determination processing at the step S115, since Δt[i−1] which becomes the time difference at the previous time t11 exceeds the time threshold tsa[i] at the step S115 (Yes), it is determined whether or not the time difference Δt[i] is equal to or greater than the time threshold tlim[i] calculated as described above in the determination processing at the step S129.

Here, when the time difference Δt[i] is equal to or greater than the time threshold tlim[i] at the step S129 (Yes), a difference between a previous speed calculated from a previous dense phase difference and a current speed calculated from a current sparse phase difference becomes large. In this case, the non-correction object is determined in order to prevent the correction based upon a speed having low reliability, and the processing after the step S123 is performed without performing the processing after the step S131.

Then, when the phase addition value φsum[i], and the like are calculated up to the last measured n-th at S143 (Yes), detection processing shown at step S147 is performed, and the movement state of the radio tag 30 is detected based upon the phase addition value φsum[i] calculated in this way. Detection data with respect to the movement state of the radio tag 30 detected in this way are transmitted to the management device 20 through the external interface 15. Further, the controller 11 for executing the detection processing can correspond to one example of a "detection part".

As described above, in the tag reader 10 according to the exemplary embodiment, the phase φ[i] and the measurement time t[i] of the response wave from the radio tag 30 measured by using the communication processing part 13 are sequentially stored in the memory 12. Then, a difference from a previous phase and a difference from a previous measurement time with respect to each phase φ[i] stored in the memory 12 are calculated as the phase difference Δφ[i] and the time difference Δt[i] at the step S103, and a phase difference in which the corresponding time difference Δt[i]

among a plurality of the calculated phase differences Δφ[i] exceeds the time threshold tsa[i] is set to be corrected at the step S115 (Yes), after which the phase addition value φsum[i] obtained by cumulatively adding a plurality of phase differences Δφ[i] is calculated at the step S133, and the like, and the movement state of the radio tag 30 is detected based upon the calculated phase addition value φsum[i] at the step S147. Next, the time required when the phase is changed by π is obtained from the movement distance λ/4 of the radio tag 30 and the movement average speed v(ave)/2 of the radio tag 30, and the time threshold tsa[i] is set to be λ/{4×v(ave)} which is half of the required time.

When the phase can be measured with the time difference which becomes equal to or less than the half period of the required time by the sampling theorem, it can be determined that the rotation of the phase (aliasing) does not occur. That is, in the case of the phase difference Δφ[i] in which the time difference Δt[i] becomes equal to or less than the time threshold tsa[i] which is set to be equal to or less than the half period of the required time, since it can be determined that the rotation of the phase does not occur and the deviation of the phase does not exist, the phase difference Δφ[i] which can be determined that the deviation of the phase does not exist in this manner, is defined as the non-correction object, thereby making it possible to prevent unnecessary correction. Accordingly, the detection accuracy can be improved by preventing the unnecessary correction with respect to the detection of the movement state of the radio tag 30 using the phase difference Δφ [i] of the response wave from the radio tag 30. Further, The time threshold tsa[i] is not limited to be set to be λ/4×v(ave)} which is the half period of the required time, but may be set to be less than λ/4×v(ave) according to the surrounding environment, and the like.

Further, as the second correction necessary/unnecessary determination method, the speed v[i] can be calculated based upon the time difference Δt[i] corresponding to phase difference Δφ[i] in which the time difference Δt[i] becomes equal to or less than the time threshold tsa[i], and even though the corresponding time difference Δt[i] among a plurality of the phase differences Δφ[i] calculated at the step S103 exceeds the time threshold tsa[i], a phase difference, in which an average speed v(ave) calculated from two or more phase differences of which the times are close to the corresponding time difference Δt[i] becomes equal to or less than the predetermined speed threshold vmin, becomes the non-correction object.

Therefore, the predetermined speed threshold vmin is set according to the speed of the radio tag 30 when the radio tag 30 moves at the low speed, such that the phase difference Δφ[i], in which the average speed v(ave) calculated from two or more phase differences of which the times are close to the corresponding time difference becomes equal to or less than the predetermined speed threshold vmin, is also determined that the radio tag 30 moves at the low speed or is stationary, whereby it can be determined that the deviation of the phase does not occur, thereby being defined as the non-correction object, based on which it is possible not only to prevent the unnecessary correction, but also to further improve the detection accuracy.

Further, as the third correction necessary/unnecessary determination method, the speed v[i] can be calculated based upon the time difference Δt[i] corresponding to the phase difference Δφ[i] in which the time difference Δt[i] becomes equal to or less than the time threshold tsa[i], and even though the corresponding time difference Δt[i] among the plurality of the phase differences Δφ[i] calculated at the step S103 exceeds the time threshold tsa[i], a phase difference, in which a sign of a speed calculated from a phase difference which is previously measured and of which the time becomes the closest and a sign of a speed calculated from a phase difference which is measured afterwards and of which the time becomes the closest are different from each other, becomes defined as the non-correction object.

Therefore, even in the case of the phase difference Δφ[i] in which the sign of the speed calculated from the phase difference which is previously measured and of which the time becomes the closest and the sign of the speed calculated from the phase difference which is measured afterwards and of which the time becomes the closest are different from each other, since the radio tag 30 is in a state of being immediately before and after the stop, the speed thereof is low, whereby it can be determined that the deviation of the phase does not occur, thereby being defined as the non-correction object, based on which it is possible not only to prevent the unnecessary correction, but also to further improve the detection accuracy.

Further, as the fourth correction necessary/unnecessary determination method, even though the corresponding time difference Δt[i] among the plurality of the phase differences Δφ[i] calculated from the step S103 exceeds the time threshold tsa[i], a phase difference, in which the corresponding time difference Δt[i] becomes equal to or greater than the time threshold tlim[i] (the second threshold) which is set to be greater than the time threshold tsa[i], becomes defined as the non-correction object.

Accordingly, the phase difference, in which the corresponding time difference Δt[i] becomes equal to or greater than the time threshold tlim[i], is defined as the non-correction object, such that the correction based upon the speed having the low reliability is prevented, thereby making it possible to prevent deterioration of the detection accuracy. Further, the time threshold tlim[i] is not limited to be set as twice the time threshold tsa[i], but may be set to be less than twice the time threshold tsa[i], or may be set to exceed twice the time threshold tsa[i], that is, four times and eight times the time threshold tsa[i] depending on the surrounding environment, and the like, for example, on the assumption that the time threshold tlim[i] becomes equal to or greater than the time threshold tsa[i].

Further, the present invention is not limited to the exemplary embodiments, modified examples thereof, and the like, and, for example, may be embodied as follows:

(1) The tag detection processing is not limited to the execution with respect to the phase of the response wave from the radio tag 30 measured for a predetermined time, and the like. Alternatively, the tag detection processing may be executed so that every time the phase is newly measured, measurement is performed up to the new phase and then the phases and the measurement times thereof stored in the memory 12 are sequentially read out.

(2) The tag detection processing is not limited to being executed by the tag reader 10, but may be executed by the management device 20, and the like which receive the detection results from the tag reader 10. In this configuration, the tag reader 10, the management device 20, and the like function as the "radio tag movement detection device".

PARTIAL DESCRIPTION OF SYMBOLS

1: conveyance management system
10: tag reader (radio tag movement detection device)
11: controller (phase measurement part, first calculation part, second calculation part, detection part)

12: memory
13: communication processing part (phase measurement part)
30: radio tag
t: measurement time
tsa: time threshold (predetermined threshold)
tlim: time threshold (second threshold)
v: speed
vmin: speed threshold (predetermined speed threshold)
φ: phase
φsum: phase addition value
Δt: time difference
Δφ: phase difference

What is claimed is:

1. A radio tag movement detection device for detecting a movement state of a radio tag, comprising:
    a phase measurement part configured to measure a phase of a response wave from the radio tag;
    a memory configured to sequentially store a phase measured by the phase measurement part together with a measurement time at which the phase is measured;
    a first calculation part configured to calculate a difference from a previous phase and a difference from a previous measurement time with respect to each phase stored in the memory as a phase difference and a time difference;
    a second calculation part configured to calculate a phase addition value obtained by cumulatively adding a plurality of the phase differences so as to correct a phase difference in which the corresponding time difference among the plurality of the phase differences calculated by the first calculation part exceeds a predetermined threshold,
    wherein the predetermined threshold is set to become equal to or less than half of a required time, the required time being a period of time necessary when a phase measured by the phase measurement part is changed by π, the required time being obtained by a movement distance and a movement average speed of the radio tag; and
    a detection part configured to detect the movement state of the radio tag based upon the phase addition value calculated by the second calculation part,
    wherein the second calculation part corrects a speed calculated based upon the time difference corresponding to the phase difference with respect to the phase difference which becomes a correction object so as to be close to a previous speed calculated based upon the time difference corresponding to a previous phase difference, and calculates the phase addition value.

2. The radio tag movement detection device according to claim 1, wherein
    the second calculation part calculates a speed based upon the time difference corresponding to the phase difference in which the time difference becomes equal to or less than the predetermined threshold; and
    when the corresponding time difference among the plurality of the phase differences calculated by the first calculation part exceeds the predetermined threshold, a phase difference, in which an average value of the speeds calculated from the two or more phase differences of which the times are close becomes equal to or less than a predetermined speed threshold, is defined as a non-correction object.

3. The radio tag movement detection device according to claim 2, wherein
    the second calculation part calculates the speed based upon the time difference corresponding to the phase difference in which the time difference becomes equal to or less than the predetermined threshold; and
    when the corresponding time difference among the plurality of the phase differences calculated by the first calculation part exceeds the predetermined threshold, a phase difference, in which a sign of the speed calculated from the phase difference which is previously measured and of which the time becomes the closest and a sign of the speed calculated from the phase difference which is measured afterwards and of which the time becomes the closest become different from each other, is defined as the non-correction object.

4. The radio tag movement detection device according to claim 2, wherein
    the second calculation part corrects a speed calculated based upon the time difference corresponding to the phase difference with respect to the phase difference which becomes a correction object so as to be close to a previous speed calculated based upon the time difference corresponding to a previous phase difference, and calculates the phase addition value.

5. The radio tag movement detection device according to claim 1, wherein
    the second calculation part calculates the speed based upon the time difference corresponding to the phase difference in which the time difference becomes equal to or less than the predetermined threshold; and
    when the corresponding time difference among the plurality of the phase differences calculated by the first calculation part exceeds the predetermined threshold, a phase difference, in which a sign of the speed calculated from the phase difference which is previously measured and of which the time becomes the closest and a sign of the speed calculated from the phase difference which is measured afterwards and of which the time becomes the closest become different from each other, is defined as the non-correction object.

6. The radio tag movement detection device according to claim 1, wherein
    when the corresponding time difference among the plurality of the phase differences calculated by the first calculation part exceeds the predetermined threshold, the second calculation part defines a phase difference, in which the corresponding time difference becomes equal to or greater than a second threshold which is set to be greater than the predetermined threshold, as a non-correction objection.

7. A radio tag movement detection method for detecting a movement state of a radio tag, the method is applied to a device comprising:
    a phase measurement part configured to measure a phase of a response wave from the radio tag; and
    a memory configured to sequentially store a phase measured by the phase measurement part together with a measurement time at which the phase is measured,
    the radio tag movement detection method including:
    first calculating a difference from a previous phase and a difference from a previous measurement time with respect to each phase stored in the memory as a phase difference and a time difference;
    second calculating a phase addition value obtained by cumulatively adding a plurality of the phase differences so as to correct a phase difference in which the corresponding time difference among the plurality of the phase differences calculated by the first calculation step exceeds a predetermined threshold, wherein the predetermined threshold is set to become equal to or less than half of a required time, the required time being a period of time necessary when a phase measured by the phase measurement part is changed by π, the required time being obtained by a movement distance and a movement average speed of the radio tag; and detecting a movement state of the radio tag based upon the phase addition value calculated by the second calculation step, wherein the second calculating step corrects a speed calculated based upon the time difference corresponding to the phase difference with respect to the phase difference which becomes a correction object so as to be close to a previous speed calculated based upon the time difference corresponding to a previous phase difference, and calculates the phase addition value.

8. A radio tag movement detection device for detecting a movement state of a radio tag, comprising:

a memory configured to sequentially store a phase of a response wave from the radio tag, the phase being measured together with a measurement time at which the phase is measured; and a controller configured to:
measure the phase of the response wave from the radio tag;

first calculate a difference from a previous phase and a difference from a previous measurement time with respect to each phase stored in the memory as a phase difference and a time difference;

second calculate a phase addition value obtained by cumulatively adding a plurality of the phase differences so as to correct a phase difference in which the corresponding time difference among the plurality of the phase differences calculated by the first calculation part exceeds a predetermined threshold, wherein the predetermined threshold is set to become equal to or less than half of a required time, the required time being a period of time necessary when a phase measured by the phase measurement part is changed by π, the required time being obtained by a movement distance and a movement average speed of the radio tag; and detect the movement state of the radio tag based upon the phase addition value calculated by the second calculation part, wherein the controller is configured to correct a speed calculated based upon the time difference corresponding to the phase difference with respect to the phase difference which becomes a correction object so as to be close to a previous speed calculated based upon the time difference corresponding to a previous phase difference, and calculate the phase addition value.

\* \* \* \* \*